United States Patent Office 3,269,896
Patented August 30, 1966

3,269,896
METHOD AND COMPOSITIONS FOR CONTROLLING PESTS
Kurt Rüfenacht, Basel, Switzerland, assignor to
J. R. Geigy A.-G., Basel, Switzerland
No Drawing. Filed Apr. 6, 1961, Ser. No. 101,082
Claims priority, application Switzerland, Apr. 29, 1960,
3,911/60
14 Claims. (Cl. 167—33)

The present invention concerns agents for pest control containing new thiophosphoric acid esters as active ingredients, and the use of the new active ingredients for combatting pests.

It has surprisingly been found that thiophosphoric acid esters and dithiophosphoric acid esters of the general formula

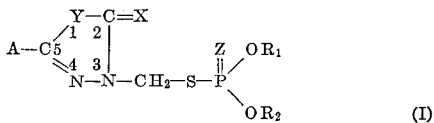

(I)

wherein

X, Y, and Z independently of each other represent sulphur or oxygen atoms, $R_1$ and $R_2$ represent identical or different alkyl groups having 1 to 3 carbon atoms, and A represents hydrogen, a low molecular alkyl radical the chain of which, if desired, can be interrupted by O or S, or a phenyl or benzyl radical substituted if desired, especially chlorinated phenyl, or a heterocyclic radical bound by way of a C atom, have excellent insecticidal and acaricidal properties and are suitable as active ingredients for pest control agents. The term "pests" includes insects and spiders, especially mites, although said term is not intended to be limited to the foregoing.

Whether the activity is predominantly insecticidal or acaricidal depends on the type of the heterocyclic ring and on the meanings of each of the substituents A, X and Z. The insecticidal active ingredient can be used as contact or stomach poisons, in some cases they also have an ovicidal action. Some of them are also systemic insecticides.

The radicals $R_1$ and $R_2$ are, in particular, methyl or ethyl radicals, but compounds in which they are n-propyl and isopropyl radicals are also active. Generally, the radicals $R_1$ and $R_2$ are identical but they can also be different from each other.

Those radicals having 1 to 7 carbon atoms are meant by low molecular alkyl radicals A such as methyl, ethyl, n-propyl, isopropyl, n-butyl, hexyl, heptyl etc. However, the preferred alkyl radicals A are those having 1 to 3 carbon atoms. Alkyl radicals the chain of which is interrupted by oxygen or sulphur atoms are, e.g., methoxymethyl, ethoxyethyl, ethoxymethyl, methylmercaptomethyl, ethylmercaptomethyl etc. Preferably halogen atoms, in particular chlorine, but also methyl, methoxy, methylmercapto, nitro and methylenedioxy radicals are possible substituents of a phenyl or benzyl radical A. Of the heterocyclic radicals A, in particular 2-furyl and, especially, 4-pyridyl, but also 2-pyridyl, 3-pyridyl, 2-thenyl and 2-thiazolyl radicals are mentioned.

To produce the new active ingredients of the general Formula I, heterocyclic halogen methyl compounds of the general formula

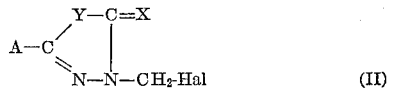

(II)

wherein Hal represents chlorine or bromine and X, Y and A have the meanings given above, are reacted, advantageously in the presence of acid binding agents, with dialkyl thiophosphoric acids of the general formula

(III)

wherein Z, $R_1$ and $R_2$ have the meanings given above, or with salts of such dialkyl thiophosphoric acids. The reactions can be performed in water or in organic solvents such as e.g. acetone, butanone, methanol, ethanol, ethyl acetate or benzene, at room temperature or at moderately elevated temperatures, advantageously between about 20–80° C. Alkali hydroxides or carbonates for example can be used as acid binding agents and, as salts of dialkyl thiophosphoric acids of the general Formula III, in particular their alkali metal salts or ammonium salts can be used.

Starting materials of the general Formula II are obtained, for example, by reacting 1,3,4-oxadiazole-2(3H)-ones, 1,3,4-oxadiazole-2(3H)-thiones, 1,3,4-thiadiazole-2(3H)-ones and 1,3,4-thiadiazole-2(3H)-thiones of the general formula

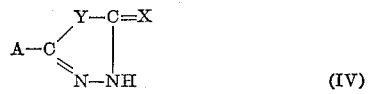

(IV)

which are substituted corresponding to the definition given for A, with formaldehyde and treating the 3-hydroxymethyl derivatives obtained with phosphorus pentachloride, thionyl chloride or phosphorus tribromide.

The heterocyclic compounds of the general formula IV can be obtained in their turn in a known manner, e.g. from carboxylic acid or thiocarboxylic acid hydrazides by reaction with phosgene or thiophosgene. Compounds of the general formula IV containing sulphur are also obtained in a known manner by reacting a carboxylic acid hydrazide with carbon disulphide and an alkali hydroxide to form alkali metal salts of an acyl dithiocarbazic acid of the formula

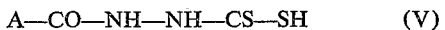

A—CO—NH—NH—CS—SH (V)

and converting these salts either (a) into 1,3,4-oxadiazole-2(3H)-thiones by boiling in alcohol while splitting off hydrogen sulphide or (b) into 1,3,4-thiadiazole-2(3H)-thiones by treating the salts with sulphuric acid and splitting off water from the dithiocarbazic acids so liberated.

The following new chloromethyl derivatives of diazole compounds, most of the diazole compounds from which these chloromethyl derivatives are derived being known, are given as examples of starting materials of the general Formula II:

3-chloromethyl-1,3,4-oxadiazole-2(3H)-one,
3-chloromethyl-5-methyl-1,3,4-oxadiazole-2(3H)-one,
3-chloromethyl-5-ethyl-1,3,4-oxadiazole-2(3H)-one,
3-chloromethyl-5-n-propyl-1,3,4-oxadiazole-2(3H)-one,
3-chloromethyl-5-isopropyl-1,3,4-oxadiazole-2(3H)-one,
3-chloromethyl-5-n-hexyl-1,3,4-oxadiazole-2(3H)-one,
3-chloromethyl-5-benzyl-1,3,4-oxadiazole-2(3H)-one,
3-chloromethyl-5-phenyl-1,3,4-oxadiazole-2(3H)-one,
3-chloromethyl-5-p-chlorophenyl-1,3,4-oxadiazole-2(3H)-one,
3-chloromethyl-5-(3',4'-methylenedioxy-phenyl)-1,3,4-oxadiazole-2(3H)-one,
3-chloromethyl-5-(2'-furyl)-1,3,4-oxadiazole-2(3H)-one,
3-chloromethyl-5-(2'-thenyl)-1,3,4-oxadiazole-2(3H)-one,
3-chloromethyl-5-(2'-pyridyl)-1,3,4-oxadiazole-2(3H)-one,
3-chloromethyl-5-(3'-pyridyl)-1,3,4-oxadiazole-2(3H)-one, 3-chloromethyl-5-(4'-pyridyl)-1,3,4-oxadiazole-2(3H)-one,
3-chloromethyl-5-methyl-1,3,4-oxadiazole-2(3H)-thione,
3-chloromethyl-5-ethyl-1,3,4-oxadiazole-2(3H)-thione,
3-chloromethyl-5-propyl-1,3,4-oxadiazole-2(3H)-thione,
3-chloromethyl-5-isopropyl-1,3,4-oxadiazole-2(3H)-thione,
3-chloromethyl-5-benzyl-1,3,4-oxadiazole-2(3H)-thione,
3-chloromethyl-5-phenyl-1,3,4-oxadiazole-2(3H)-thione,
3-chloromethyl-5-o-tolyl-1,3,4-oxadiazole-2(3H)-thione,
3-chloromethyl-5-p-tolyl-1,3,4-oxadiazole-2(3H)-thione,
3-chloromethyl-5-m-tolyl-1,3,4-oxadiazole-2(3H)-thione,
3-chloromethyl-5-p-methoxyphenyl-1,3,4-oxadiazole-2(3H)-thione,
3-chloromethyl-5-o-methoxyphenyl-1,3,4-oxadiazole-2(3H)-thione,
3-chloromethyl-5-p-nitrophenyl-1,3,4-oxadiazole-2(3H)-thione,
3-chloromethyl-5-(2'-furyl)-1,3,4-oxadiazole-2(3H)-thione,
3-chloromethyl-5-(2'-thiazolyl)-1,3,4,oxadiazole-2(3H)-thione,
3-chloromethyl-5-(2'-pyridyl)-1,3,4-oxadiazole-2(3H)-thione,
3-chloromethyl-5-(3'-pyridyl)-1,3,4-oxadiazole-2(3H)-thione,
3-chloromethyl-5-(4'-pyridyl)-1,3,4-oxadiazole-2(3H)-thione,
3-chloromethyl-5-methyl-1,3,4-thiadiazole-2(3H)-one,
3-chloromethyl-5-phenyl-1,3,4-thiadiazole-2(3H)-one,
3-chloromethyl-1,3,4-thiadiazole-2(3H)-thione,
3-chloromethyl-5-phenyl-1,3,4-thiadiazole-2(3H)-thione,
3-chloromethyl-5-p-chlorophenyl-1,3,4-thiadiazole-2(3H)-thione,
3-chloromethyl-5-p-methoxyphenyl-1,3,4-thiadiazole-2(3H)-thione,
3-chloromethyl-5-methyl-1,3,4-thiadiazole-2(3H)-thione,
3-chloromethyl-5-n-heptyl-1,3,4-thiadiazole-2(3H)-thione,
3-chloromethyl-5-(4'-pyridyl)-1,3,4-thiadiazole-2(3H)-thione,
3-chloromethyl-5-(3'-pyridyl)-1,3,4-thiadiazole-2(3H)-thione and
3-chloromethyl-5-(2'-furyl)-1,3,4-thiadiazole-2(3H)-thione.

Dimethyl thiophosphoric acid, diethyl thiophosphoric acid, di-isopropyl thiophosphoric acid, dimethyl dithiophosphoric acid, diethyl-dithiophosphoric acid and di-isopropyl dthiophosphoric acid or their alkali metal or ammonium salts, for example, can be reacted as dialkyl thiophosphoric acids of the general Formula III with these compounds.

The following examples further illustrate the production of the new compounds; parts are given therein as parts by weight; their relationship to parts by volume is as that of grammes to cubic centimeters. The temperatures are in degrees centigrade.

*Example 1*

(a) 86 parts of 1,3,4-oxadiazole-2(3H)-one (Dornow and Bruncken, Ber. 82, 121 (1949) and 90 parts by volume of an about 37% aqueous formaldehyde solution are heated for 30 minutes at 70°. All volatile components are then distilled off in a water jet vacuum at a bath temperature of 60°. The 3-hydroxymethyl-1,3,4-oxadiazole-2(3H)-one which remains as a colourless oil is quickly poured into a solution, cooled to 5°, of 140 parts of thionyl chloride in 280 parts by volume of anhydrous benzene. The whole is stirred for 4 hours at room temperature and hydrogen chloride and SO₂ are removed to a great extent with a dry stream of air. The benzene is then distilled off in vacuo and afterwards the residue is distilled in a high vacuum. 3-chloromethyl-1,3,4-oxadiazol-2(3H)-one passes over at 60–61°/0.25 mm. as a colourless to pale yellow coloured oil.

(b) 14 parts of 3-chloromethyl-1,3,4-oxadiazol-2(3H)-one are added dropwise to the solution of 23 parts of potassium salt of O,O-dimethyl-dithiophosphoric acid in 100 parts by volume of acetone whereupon the temperature rises to 30°. The whole is stirred for 4 hours at 30°, then 50 parts of water are added and the acetone is removed to a great extent by distilling in a water jet vacuum at a bath temperature of 40°. The precipitated oil is taken up in ether, washed with dilute sodium bicarbonate solution and with water and dried. After distilling off the ether, O,O-dimethyl - S - [1,3,4 - oxadiazol - 2(3H) - onyl - (3)-methyl]dithiophosphate remains as a pale yellow oil which, on molecular distillation, passes over at 110°/0.005 mm.

*Example 2*

21 parts of the ammonium salt of O,O-diethyl-monothiophosphoric acid and 14 parts of 3-chloromethyl-1,3,4-oxadiazol-2(3H)-one are stirred in 50 parts by volume of acetone for 4 hours at 50°. 30 parts of water are then added and the product is worked up analogously to Example 1(b). O,O-diethyl-S-[1,3,4-oxadiazol-2(3H)-onyl-(3)-methyl]-thiophosphate remains as a brown oil which, on molecular distillation, passes over at 105°/0.001 mm.

*Example 3*

(a) A thorough mixture of 100 parts of 5-methyl-1,3,4-oxadiazol-2(3H)-one (Dornow and Bruncken, loc. cit.) and 31 parts of paraformaldehyde is heated to 90°. After a melt has been formed, it is stirred for 2 hours at 80–90°. It is then diluted with 750 parts by volume of chloroform, cooled to room temperature and 140 parts of thionyl chloride are dropped in quickly the temperature being kept at, at most, 35°. The whole is then heated for 2 hours at 60°, the chloroform is distilled off and the residue is distilled in a high vacuum. The 3-chloromethyl-5-methyl-1,3,4-oxadiazol-2(3H)-one passes over as a colourless oil at 68–69°/0.1 mm.

If the thionyl chloride is replaced by 135 parts of phosphorus tribromide, then 3-bromomethyl-5-methyl-1,3,4-oxadiazol-2(3H)-one is obtained in an analogous manner. It can be distilled as a colourless oil at 80–81°/0.1 mm.

(b) 50 parts by volume of an aqueous solution of 25 parts of the potassium salt of O,O-diethyl dithiophosphoric acid and 15 parts of 3-chloromethyl-5-methyl-1,3,4-oxadiazol-2(3H)-one are vigorously stirred together for 2 hours at 60°. The mixture is then cooled, the oil which separtes is taken up in ether and the product is worked up analogously to Example 1(b). O,O-diethyl-S-[5-methyl-1,3,4 - oxadiazol - 2(3H) - onyl - (3) - methyl] - dithiophosphate is obtained as a pale yellow oil which, on molecular distillation, passes over at 120°/0.01 mm.

*Example 4*

15 parts of 3-chloromethyl-5-methyl-1,3,4-oxadiazol-2(3H)-one and 21 parts of O,O-diethyl dithiophosphoric acid are dissolved in 150 parts by volume of ethyl acetate. 11 parts of anhydrous triethylamine are then added dropwise whereupon the temperature rises to about 40°. The whole is then refluxed for 10 minutes, cooled, 25 parts of water are added, the phases are separated and the ethyl acetate phase is washed, first with dilute sodium bicarbonate solution, then with water, then with dilute hydrochloric acid and finally with water. After drying with sodium sulphate, the ethyl acetate is distilled off and the O,O - diethyl - S - [5 - methyl - 1,3,4 - oxadiazol - 2(3H) - onyl-(3)-methyl]-dithiophosphate is distilled under a high vacuum; B.P. 142°/0.1 mm.

On replacing the triethylamine by 9 parts of pyridine, an identical product is obtained in an analogous manner.

*Example 5*

15 parts of 3-chloromethyl-5-methyl-1,3,4-oxadiazol-2(3H)-one, 25 parts of O,O-diethyl dithiophosphoric acid and 20 parts of anhydrous potassium carbonate in 200 parts by volume of anhydrous benzene are boiled for 4 hours in a water separator. It is then cooled, 25 parts of water are added and the whole is well shaken. The phases are separated and the benzene phase is washed with water and dried. After distilling off the benzene, O,O-diethyl-S-[5-methyl-1,3,4 - oxadiazol - 2(3H)-onyl-(3)-methyl]-dithiophosphate is also obtained. It is identical with the end products obtained in Examples 3 and 4.

*Example 6*

39 parts of the ammonium salt of O-methyl-O'-ethyl-monothiophosphoric acid and 22 parts of 3-chloromethyl-5-methyl-1,3,4-oxadiazol-2(3H)-one in 150 parts by volume of acetone are stirred for 4 hours at 60°. 75 parts of water are then added and the acetone is distilled off in a water jet vacuum at a bath temperature of 30–40°. The aqueous solution is extracted several times with ethyl acetate. The combined ethyl acetate solutions are washed neutral with a little saturated sodium bicarbonate solution and dried. After distilling off the ethyl acetate, the residue is fractionated under a high vacuum. The O-methyl-O'ethyl-S-[5-methyl - 1,3,4 - oxadiazol-2-(3H)-onyl-(3)-methyl]-thiophosphate passes over as a yellow oil at 145°/0.01 mm.

*Example 7*

(a) 57 parts of 5-ethyl-1,3,4-oxadiazol-2(3H)-one (Dornow and Bruncken, loc. cit.) and 16 parts of paraformaldehyde are stirred for 2 hours at 90° whereupon a clear melt is formed. The melt is diluted with 400 parts by volume of chloroform, cooled to room temperature and 70 parts of thionyl chloride are poured in, during which the temperature should not exceed 40°. The whole is then heated for 2 hours at 60–65°, the chloroform is distilled off and the residue is distilled under a high vacuum. The 3-chloromethyl-5-ethyl-1,3,4-oxadiazol-2(3H)-one is a colourless oil which passes over at 68°/0.02 mm.

(b) 28 parts of the potassium salt of O,O-di-isopropyl-dithiophosphoric acid and 16 parts of 3-chloromethyl-5-ethyl-1,3,4-oxadiazol-2(3H)-one in 100 parts by volume of acetone are stirred for 4 hours at 40°. 100 parts of water are then added and the product is worked up analogously to Example 1(b). O,O-di-isopropyl-S-[5-ethyl-1,3,4-oxadiazol-2(3H)-onyl - (3) - methyl]-dithiophosphate is obtained as an almost colourless oil which, on molecular distillation, passes over at 115°/0.001 mm.

*Example 8*

(a) 5-isopropyl-1,3,4-oxadiazol-2(3H)-one is obtained as a colourless oil boiling at 107°/0.03 mm, analogously to the method described by Dornow and Bruncker (loc. cit.) for 5-propyl-1,3,4-oxadiazol-2(3H)-one. 128 parts of 5-isopropyl-1,3,4-oxadiazol-2(3H)-one and 32 parts of paraformaldehyde are reacted analogously to Example 7(a). The reaction mixture is diluted with 700 parts by volume of chloroform and is treated, analogously to Example 7(a), with 140 parts of thionyl chloride. The 3-chloromethyl-5-isopropyl-1,3,4-oxadiazol-2(3H)-one is a colourless oil which boils at 72°/0.01 mm.

(b) 25 parts of the potassium salt of O,O-diethyl-dithiophosphoric acid and 18 parts of 3-chloromethyl-5-isopropyl-1,3,4-oxadiazol-2(3H)-one in 100 parts by volume of acetone are stirred for 18 hours at room temperature. Then 100 parts of water are added and the mixture is worked up as described in Example 1(b). O,O-diethyl-S-[5-isopropyl-1,3,4-oxadiazol - 2(3H) - onyl-(3)-methyl]-dithiophosphate is obtained as a pale yellow oil which, on molecular distillation, passes over at 120°/0.001 mm.

*Example 9*

(a) 5-methoxy-methyl-1,3,4-oxadiazol-2(3H)-one is obtained as a colourless oil boiling at 114°/0.3 mm. analogously to Dornow and Bruncken (loc. cit.). 130 parts of this compound and 32 parts of paraformaldehyde are reacted analogously to Example 7(a). The melt obtained is then dissolved in 150 parts by volume of chloroform and this solution is poured into a cooled solution of 150 parts of thionyl chloride in 300 parts by volume of chloroform, during which addition the temperature should not rise above 30°. The whole is then heated for 2 hours at 60–65° whereupon the chloroform is distilled off.

The 3-chloromethyl-5-methoxy-methyl-1,3,4-oxadiazol-2(3H)-one passes over as a colourless oil at 90–92°/0.4 mm.

(b) 110 parts of ammonium salt of O,O-dimethyl-monothiophosphoric acid and 89 parts of 3-chloromethyl-5-methoxymethyl-1,3,4-oxadiazol-2(3H)-one are dissolved in 300 parts by volume of acetone and the solution is stirred for 4 hours at 60°. 150 parts of water are then added and the acetone is distilled off in a water jet vacuum at a bath temperature of 40°. The oil which separates is taken up in ethyl acetate, washed with a little sodium bicarbonate solution and water and dried. After distilling off the ethyl acetate, all volatile components are removed under high vacuum at a bath temperature of 40° and, after filtering with a little animal charcoal, analytically pure O,O-dimethyl-S-[5-methoxy-methyl-1,3,4-oxadiazol-2(3H)-onyl-(3)-methyl]-thiophosphate is obtained as an almost colourless oil.

*Example 10*

(a) 5-methylthio-methyl-1,3,4-oxadiazol-2(3H)-one is obtained from S-methyl thioglycolic acid hydrazide analogously to Dornow and Bruncken (loc. cit.). The crude product melts at 76–77°. 58 parts of this compound and 13 parts of paraformaldehyde are stirred for 2 hours at 80° whereupon a clear melt is formed. This is dissolved in 100 parts by volume of chloroform and the solution is poured into a cooled solution of 65 parts of thionyl chloride in 150 parts by volume of chloroform. The whole is heated for 2 hours at 60–65° and the product is obtained by distillation. The 3-chloromethyl-5-methyl-thio-methyl-1,3,4-oxadiazol-2(3H)-one distills as a pale yellow oil at 100°/0.1 mm.

(b) 19 parts of 3-chloromethyl-5-methylthio-methyl-1,3,4-oxadiazol-2(3H)-one are added dropwise to a solution of 23 parts of the potassium salt of O,O-dimethyl-dithiophosphoric acid in 100 parts by volume of acetone. The temperature rises to 33°. The whole is stirred for another 4 hours at room temperature, then 100 parts of water are added and the product is worked up analogously to Example 1(b). In this way, O,O-dimethyl-S-[5-methylthio-methyl-1,3,4-oxadiazol - 2(3H) - onyl-(3)-methyl]-dithiophosphate is obtained as a pale yellow oil which cannot be distilled.

*Example 11*

(a) 5-benzyl-1,3,4-oxadiazol-2(3H)-one is obtained by reacting a hydrochloric acid, aqueous solution of phenyl-acetohydrazide with phosgene (M.P. 51–52°). 141 parts of this compound and 25 parts of paraformaldehyde are reacted analogously to Example 7(a). The melt formed is dissolved in 300 parts by volume of chloroform and this solution is quickly poured into a well cooled solution of 120 parts of thionyl chloride in 240 parts by volume of chloroform. The whole is then heated for 1½ hours at 60–65°, the chloroform is distilled off and the residue is distilled under a high vacuum. The 3-chloromethyl-5-benzyl-1,3,4-oxadiazol-2(3H)-one passes over as a pale yellow oil at 118–120°/0.04 mm. After a short time, it solidifies crystalline and, after recrystallisation from carbon tetrachloride/petroleum ether, it melts at 86–88°.

(b) 21 parts of the ammonium salt of O,O-diethyl-monothiophosphoric acid and 20 parts of 3-chloromethyl-5-benzyl-1,3,4-oxadiazol-2(3H)-one are dissolved in 100 parts by volume of acetone and the solution is stirred for 5 hours at 50°. 100 parts of water are then added. On working up analogously to Example 1(b), O,O-di-ethyl-S-[5-benzyl-1,3,4-oxadiazol - 2(3H)-onyl-(3)-methyl]-thiophosphate is obtained as a brown oil which cannot be distilled.

Example 12

(a) 42 parts of phosphorus pentachloride are suspended in 200 parts by volume of alcohol-free chloroform. 38 parts of 3-hydroxymethyl-5-phenyl-1,3,4-oxadiazol-2(3H)-one (Caldwell, Seiwald and Bruckhalter, J. Am. Pharm. Assoc. 47, 799 (1958)) are added in portions at a temperature not exceeding 5° while cooling well, whereupon the whole is stirred for 20 hours at room temperature. All volatile components are then distilled off in a water jet vacuum at a bath temperature of, advantageously, at most 50°. The crystalline residue is stirred well with 100 parts of water, filtered off and dried. On recrystallising from carbon tetrachloride/petroleum ether, the 3-chloromethyl - 5 - phenyl - 1,3,4-oxadiazol-2(3H)-one so obtained melts at 114–115°.

(b) 23 parts of the potassium salt of O,O-dimethyl-dithiophosphoric acid and 21 parts of 3-chloromethyl-5-phenyl-1,3,4-oxadiazol-2(3H)-one are stirred in 100 parts by volume of acetone for 4 hours at 40°, 100 parts of water are then added and the acetone is distilled off in a water jet vacuum at a bath temperature of 40°. The oily residue so obtained solidifies crystalline. It is filtered off and recrystallised from methanol. The O,O-dimethyl-S-[5-phenyl - 1,3,4 - oxadiazol - 2(3H)-onyl-(3)-methyl]-dithiophosphate so obtained melts at 80–81°.

Example 13

(a) 65 parts of 5-p-chlorophenyl-1,3,4-oxadiazol-2-(3H)-one (M.P. 225°, obtained by reacting phosgene with p-chlorobenzohydrazide in hydrochloric acid, aqueous suspension) are dissolved in 250 parts by volume of about a 37% aqueous formaldehyde solution by heating to the boil. 125 parts of hot water are then added; the oil which then separates becomes crystalline after a short time. This is filtered off and dried at 40° (decomposition with splitting off of formaldehyde at over 100°). 23 parts of the 3-hydroxymethyl-5-p-chlorophenyl-1,3,4-oxadiazol-2(3H)-one so obtained are added in portions to a suspension of 21 parts of phosphorus pentachloride in 400 parts by volume of alcohol-free chloroform, the temperature being kept under 5° by cooling well. The procedure is then analogous to Example 12(a). After recrystallising from carbon tetrachloride/petroleum ether, the 3-chloromethyl-5-p-chlorophenyl-1,3,4-oxadiazol-2-(3H)-one so obtained melts at 84–86°.

(b) 24 parts of the potassium salt of O,O-dimethyl-dithiophosphoric acid are dissolved in 100 parts by volume of methyl alcohol. 25 parts of 3-chloromethyl-5 - p - chlorophenyl-1,3,4-oxadiazol-2(3H)-one are then added. The temperature quickly rises to 45° and crystallisation begins. The whole is stirred for another 4 hours at room temperature whereupon the product is filtered off and thoroughly washed with water. After recrystallisation from alcohol, the O,O-dimethyl-S-[p-chlorophenyl - 1,3,4 - oxadiazol-2(3H)-onyl-(3)methyl]-dithiophosphate so obtained melts at 105–106°.

Example 14

(a) 152 parts of 5-(2'-furyl)-1,3,4-oxadiazol-2(3H)-one (Yale, Losee, Perry and Bernstein, J. Am. Chem. Soc. 76, 2208, (1954)) and 300 parts by volume of an about 37% aqueous formaldehyde solution are boiled until a complete solution is obtained. 300 parts of water are then added and crystallisation is effected by cooling. The 3-hydroxymethyl-5-(2'-furyl)-1,3,4-oxadiazol-2(3H)-one obtained melts between 100 and 115° while splitting off formaldehyde. 91 parts of this hydroxymethyl compound are added to a suspension of 105 parts of phosphorus pentachloride in 600 parts by volume of alcohol-free chloroform, the temperature being kept by cooling under 5°. The whole is then stirred for 3 hours at room temperature, whereupon all volatile components are removed in a water jet vacuum at a bath temperature of, advantageously, 30°. The crystalline residue is well stirred with 250 parts of water, filtered off and dried. After recrystallising from carbon tetrachloride/petroleum ether, the 3-chloromethyl-5-(2'-furyl)-1,3,4-oxadiazol-2(3H)-one obtained melts at 91–93°.

(b) 27 parts of the ammonium salt of O,O-dimethyl-monothiophosphoric acid and 25 parts of 3-chloromethyl-5-(2'-furyl)-1,3,4-oxadiazol-2(3H)-one are stirred in 100 parts by volume of acetone for 4 hours at 40°. After adding 100 parts of water, working up analogously to Example 1(b) and recrystallising from methyl alcohol, O,O - dimethyl - S - [5-(2'-furyl)-1,3,4-oxadiazol-2(3H)-onyl-(3)-methyl]-thiophosphate is obtained which melts at 68–69°.

Example 15

(a) 82 parts of 5-(4'-pyridyl)-1,3,4-oxadiazol-2(3H)-one (Stempel, Zelauskas and Aeschlimann, J. Org. Chem. 20, 412, (1955)) and 1000 parts by volume of an about 37% aqueous formaldehyde solution are boiled until complete solution is obtained. 500 parts of water are then added and the product is crystallised by cooling The 3 - hydroxymethyl - 5-(4'-pyridyl)-1,3,4-oxadiazol-2(3H)-one obtained melts at about 180° while splitting off formaldehyde. 20 parts of 3-hydroxymethyl-5-(4'-pyridyl)-1,3,4-oxadiazol-2(3H)-one are suspended in 150 parts by volume of chloroform. The suspension is cooled to 0° and 14 parts of thionyl chloride are quickly poured in, whereupon the whole is refluxed for 30 minutes and then the precipitated hydrochloride of 3-chloromethyl-5-(4'-pyridyl)-1,3,4-oxadiazol-2(3H)-one is filtered off.

(b) A solution of 4.5 parts of caustic soda in 25 parts of water is added dropwise to the mixture of 25 parts of the potassium salt of O,O-diethyl-dithiophosphoric acid, 25 parts of the hydrochloride of 3-chloromethyl-5-(4'-pyridyl)-1,3,4-oxadiazol-2(3H)-one and 75 parts by volume of acetone; the temperature rises to 30–35°. The whole is stirred for 4 hours at room temperature, then 150 parts of water are added and the acetone is distilled off in a water jet vacuum at 30°. The oily residue so obtained soon solidifies crystalline. It is filtered off and recrystallised from methanol. The O,O - diethyl - S - [5-(4'-pyridyl)-1,3,4-oxadiazol-2(3H)-onyl-(3)-methyl]-dithiophosphate so obtained melts at 54–55°.

Example 16

(a) From 116 parts of 5-methyl-1,3,4-oxadizole-2(3H)-thione (Hoggarth, J. Chem. Soc. 1952, 4811), 3-chloromethyl-5-methyl-1,3,4-oxadizole-2(3H)-thione is obtained analogously to Example 3(a). It is a colourless oil which boils at 79°/0.1 mm.

(b) From 23 parts of the potassium salt of O,O-dimethyl-dithiophosphoric acid and 17 parts of the above 3 - chloromethyl-5-methyl-1,3,4-oxadiazole-2(3H)-thione, O,O - dimethyl - S-[5-methyl-1,3,4-oxadiazole-2(3H)-thionyl-(3)-methyl]-dithiophosphate is obtained analogously to Example 1(b) as a colourless oil. On molecular distillation, it passes over at 145°/0.001 mm. under slight decomposition.

Example 17

(a) From 130 parts of 5-ethyl-1,3,4-oxadiazole-2(3H)-thione (Ainsworth, J. Am. Chem. Soc. 78, 4475 (1956)), 3 - chloromethyl-5-ethyl-1,3,4-oxadiazole-2(3H)-thione is obtained analogously to Example 7(a) as a colourless oil which melts at 105°/2 mm.

(b) 31 parts of the ammonium salt of O,O-dimethyl-monothiophosphoric acid and 27 parts of 3-chloromethyl-5-ethyl-1,3,4-oxadiazole-2(3H)-thione in 150 parts by volume of acetone are refluxed for 4 hours. 150 parts of water are then added and the product is worked up analogously to Example 1(b). O,O-dimethyl-S-[5-ethyl-1,3,4 - oxadiazole - 2(3H)-thionyl-(3)-methyl]-thiophosphate is obtained as a pale yellow oil which cannot be distilled.

Example 18

(a) From 144 parts of 5-n-propyl-1,3,4-oxadiazole-2(3H)-thione (Ainsworth, loc. cit.), 3-chloromethyl-5- n-propyl-1,3,4-oxadiazole-2(3H)-thione is obtained analogously to Example 7(a) as a yellow oil which boils at 107°/1 mm.

(b) From 37 parts of the potassium salt of O,O-diethyl-dithiophosphoric acid and 29 parts of 3-chloromethyl-5-n-propyl-1,3,4-oxadiazole-2(3H)-thione in 150 parts by volume of acetone, O,O-diethyl-S-[5-n-propyl-1,3,4 - oxadiazole-2(3H)-thionyl-(3)-methyl]dithiophosphate is obtained analogously to Example 8(b). On molecular distillation, it passes over as an almost colourless oil at 130°/0.02 mm.

Example 19

(a) 5-isopropyl-1,3,4-oxadiazole-2(3H)-thione can be produced analogously to the method described by Ainsworth (loc. cit.). It is a colourless oil which boils at 113°/0.5 mm.

The 3-chloromethyl compound obtained analogously to Example 7(a) from 144 parts of 5-isopropyl-1,3,4-oxadiazole-2(3H)-thione distills at 94°/1 mm. as a pale yellow oil.

(b) From 32 parts of the ammonium salt of O,O-diethyl-monothiophosphoric acid and 29 parts of 3-chloromethyl - 5-isopropyl-1,3,4-oxadiazole-2(3H)-thione in 150 parts by volume of acetone, O,O-diethyl-[5-isopropyl - 1,3,4-oxadiazole-2(3H)-thionyl-(3)-methyl]-thiophosphate is obtained analogously to Example 11(b) as a pale brown oil which cannot be distilled.

Example 20

(a) 125 parts of 5-phenyl-1,3,4-oxadiazole-2(3H)-thione (Hoggarth, loc. cit.) and 700 parts by volume of an about 37% aqueous formaldehyde solution are boiled until complete solution is obtained. It is then cooled to 60–70° and 350 parts by volume of methyl alcohol are added. On further cooling, the 3-hydroxymethyl - 5-phenyl-1,3,4-oxadiazole-2(3H)-thione crystallises out; above 130°, formaldehyde is gradually split off. 63 parts of the above 3-hydroxymethyl-5-phenyl-1,3,4-oxadiazole-2(3H)-thione are added at under 5° to a well cooled suspension of 63 parts of phosphorus pentachloride in 300 parts by volume of alcohol-free chloroform, and the whole is stirred for 24 hours at room temperature. All volatile components are then distilled off in a water jet vacuum at a bath temperature of, preferably, 30°. A crystalline residue is obtained. This is stirred well with 200 parts of cold water, filtered off and dried. After recrystallising from carbon tetrachloride/petroleum ether, the 3 - chloromethyl - 5-phenyl-1,3,4-oxadiazole-2(3H)-thione obtained melts at 104–106°.

(b) 23 parts of the potassium salt of O,O-dimethyl-dithiophosphoric acid and 23 parts of 3-chloromethyl-5-phenyl-1,3,4-oxadiazole-2(3H)-thione are dissolved in 100 parts by volume of acetone and the whole is stirred for 4 hours at 35°. On the addition of 150 parts of water an oil separates; this quickly solidifies crystalline. After recrystallising from methyl alcohol, the O,O-dimethyl-S-[5 - phenyl-1,3,4-oxadiazole-2(3H)-thionyl-(3)-methyl]-dithiophosphate obtained melts at 100–101°.

Example 21

(a) 76 parts of thiobenzohydrazide are dissolved in a mixture of 250 parts by volume of water and 250 parts by volume of an about 2 N-hydrochloric acid. Phosgene is introduced at between 0 and 20° until no more precipitate is formed. The precipitate is filtered off and crystallised from dilute alcohol. The 5-phenyl-1,3,4-thiadiazol-2(3H)-one so obtained melts at 150–151°.

107 parts of 5-phenyl-1,3,4-thiadiazol-2(3H)-one and 500 parts by volume of an about 37% aqueous formaldehyde solution are boiled until complete solution is obtained. 300 parts by volume of water are then added and the whole is stirred while gradually cooling until crystallisation begins. The 3-hydroxymethyl-5-phenyl-1,3,4-thiadiazol-2(3H)-one so obtained gradually splits off formaldehyde at over 110°.

On reacting the above product with phosphorus pentachloride analogously to Example 20(a), 3-chloromethyl-5-phenyl-1,3,4-thiadiazol-2(3H)-one is obtained which, after recrystallisation from carbon tetrachloride, melts at 128–129°.

(b) 32 parts of the ammonium salt of O,O-dimethyl-monothiophosphoric acid and 34 parts of 3-chloromethyl-5-phenyl-1,3,4-thiadiazol-2(3H)-one are stirred for 4 hours at 50° in 150 parts by volume of acetone. 100 parts of water are then added and the acetone is distilled off in a water jet vacuum at 40°. During this distillation, the O,O - dimethyl-S-[5-phenyl-1,3,4-thiadiazol-2(3H)-onyl-(3)-methyl]-thiophosphate precipitates direct in crystalline form. After recrystallisation from methyl alcohol, it melts at 80–81°.

Example 22

(a) 97 parts of 5-phenyl-1,3,4-thiadiazol-2(3H)-thione (Ainsworth, J. Am. Chem. Soc. 80, 5201 (1958)) and 500 parts by volume of an about 37% aqueous formaldehyde solution are stirred vigorously for 2 hours at 100°; a solution is only slowly attained. 500 parts by volume of water are then added whereupon an oil separates. Crystallisation can be attained by cooling and rubbing. The 3-hydroxymethyl - 5-phenyl-1,3,4-thiadiazole-2(3H)-thione obtained melts at 95–100° without splitting off formaldehyde.

112 parts of the above 3-hydroxymethyl compound are added to a suspension of 115 parts of phosphorus pentachloride in 1000 parts by volume of alcohol-free chloroform at under 5°. The whole is then stirred for 24 hours at room temperature, after which it is heated to 40° until the solution becomes clear. All volatile components are thoroughly removed in a water jet vacuum at 30°. The crystalline residue is well stirred with 500 parts of ice cold water, filtered off and dried. After recrystallisation from chloroform, the 3-chloromethyl-5-phenyl-1,3,4-thiadiazole-2(3H)-thione obtained melts at 149–151°.

(b) 23 parts of the potassium salt of O,O-dimethyl-dithiophosphoric acid and 24 parts of 3-chloromethyl-5-phenyl-1,3,4-thiadiazole-2(3H)-thione are dissolved in 100 parts by volume of acetone and the solution is refluxed for 15 minutes. 100 parts of water are then added and the acetone is distilled off in a water jet vacuum. The O,O - dimethyl - S - [5 - phenyl-1,3,4-thiadiazole-2(3H)-thionyl-(3)-methyl]-dithiophosphate separates direct in crystalline form. After recrystallisation from methyl alcohol, it melts at 75–76°.

Example 23

(a) 5-methyl - 1,3,4 - thiadiazole-2(3H)-thione is obtained analogously to Ainsworth (loc. cit.); it melts at 186–187°. 132 parts of this compound and 130 parts by volume of an about 37% aqueous formaldehyde solution are stirred together for half an hour at 90–100°. 260 parts of water are then added and the oil which separates is crystallised by cooling and rubbing. The 3-hydroxymethyl-5-methyl-1,3,4-thiadiazole - 2(3H)-thione so obtained contains crystal water and melts at 70–75°.

86 parts of this hydroxymethyl compound are added at under 5° to a suspension of 160 parts of phosphorus pentachloride in 1000 parts by volume of alcohol-free chloroform. The whole is stirred for 12 hours at room temperature and then all volatile components are distilled off at 40° in a water jet vacuum. The oily residue is stirred with 500 parts of cold water until it becomes crystalline. After filtering off the crystals and drying, they are dissolved in carbon tetrachloride; petroleum ether is added until the solution becomes distinctly cloudy whereupon it is filtered with animal charcoal. After rubbing, the 3-chloromethyl - 5 - methyl-1,3,4-thiadiazole-2(3H)-thione crystallises out; it melts at 68–70°.

(b) 18 parts of 3-chloromethyl-5-methyl-1,3,4-thiadiazole-2(3H)-thione are added to a solution of 25 parts of the potassium salt of O,O-diethyl-dithiophosphoric acid in 100 parts by volume of acetone, whereupon the temperature rises to 28°. The whole is stirred for another 4 hours at room temperature, 100 parts of water are added and the product is worked up as described in Example 1(b). After distilling off the ether, the oil which remains soon solidifies crystalline. After recrystallising from methyl alcohol, the O,O-diethyl-S-[5-methyl-1,3,4-thiadiazole-2(3H)-thionyl - (3) - methyl]-dithiophosphate obtained melts at 52–53°.

Also the following compounds of the general formula

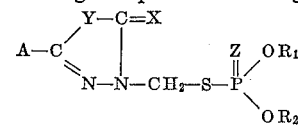

which are tabulated below are produced according to the above examples.

| No. | A | X | Y | Z | $R_1$ and $R_2$ | B.P. on molecular distillation | M.P., on molecular distillation |
|---|---|---|---|---|---|---|---|
| 1 | H— | O | O | S | $C_2H_5$— | 105°/0.001 | |
| 2 | H— | O | O | S | iso-$C_3H_7$— | 110°/0.001 | |
| 3 | $CH_3$— | O | O | S | $CH_3$— | 110°/0.001 | |
| 4 | $CH_3$— | O | O | S | iso-$C_3H_7$— | 120°/0.001 | |
| 5 | $CH_3$— | O | O | O | $CH_3$— | 130°/0.01 | |
| 6 | $CH_3$— | O | O | O | $C_2H_5$— | 110°/0.001 | |
| 7 | $C_2H_5$— | O | O | S | $CH_3$— | 110°/0.001 | |
| 8 | $C_2H_5$ | O | O | S | $C_2H_5$— | 115°/0.001 | |
| 9 | $C_2H_5$— | O | O | O | $C_2H_5$— | 105°/0.001 | |
| 10 | iso-$C_3H_7$— | O | O | S | $CH_3$— | 110°/0.001 | |
| 11 | iso-$C_3H_7$ | O | O | O | $C_2H_5$— | 115°/0.001 | |
| 12 | $CH_3OCH_2$— | O | O | S | $CH_3$— | 120°/0.002 | |
| 13 | $CH_3OCH_2$— | O | O | S | $C_2H_5$— | 125°/0.001 | |
| 14 | $CH_3OCH_2$— | O | O | O | $C_2H_5$— | Not distillable | |
| 15 | $CH_3SCH_2$— | O | O | S | $C_2H_5$— | 145°/0.003 | |
| 16 | ⬡—$CH_2$— | O | O | S | $CH_3$— | Not distillable | |
| 17 | ⬡—$CH_2$— | O | O | S | $C_2H_5$— | do | |
| 18 | ⬡— | O | O | S | $C_2H_5$— | | 70–71° |
| 19 | ⬡— | O | O | O | $CH_3$— | | 123–124° |
| 20 | ⬡— | O | O | O | $C_2H_5$— | | 68–69° |
| 21 | Cl—⬡— | O | O | S | $C_2H_5$— | | 88–89° |
| 22 | Cl—⬡— | O | O | O | $CH_3$— | | 121–122° |
| 23 | Cl—⬡— | O | O | O | $C_2H_5$— | | 98–99° |
| 24 | furyl | O | O | S | $CH_3$— | | 64–65° |
| 25 | furyl | O | O | S | $C_2H_5$— | Not distillable | |
| 26 | furyl | O | O | O | $C_2H_5$— | do | |
| 27 | pyridyl | O | O | S | $CH_3$— | | 96–98° |
| 28 | $CH_3$— | S | O | S | $C_2H_5$— | 150°/0.001 | |
| 29 | $CH_3$— | S | O | O | $CH_3$— | Not distillable | |
| 30 | $CH_3$— | S | O | O | $C_2H_5$— | 140°/0.01 | |
| 31 | $C_2H_5$— | S | O | S | $CH_3$— | Not distillable | |
| 32 | $C_2H_5$— | S | O | S | $C_2H_5$— | 125°/0.02 | |
| 33 | $C_2H_5$— | S | O | O | $C_2H_5$— | Not distillable | |
| 34 | n-$C_3H_7$— | S | O | S | $CH_3$— | do | |
| 35 | n-$C_3H_7$— | S | O | O | $CH_3$— | do | |
| 36 | n-$C_3H_7$— | S | O | O | $CH_3$— | do | |
| 37 | iso-$C_3H_7$— | S | O | S | $CH_3$— | do | |
| 38 | iso-$C_3H_7$— | S | O | S | $C_2H_5$— | 130°/0.05 | |
| 39 | iso-$C_3H_7$— | S | O | O | $CH_3$— | Not distillable | |
| 40 | ⬡— | S | O | S | $C_2H_5$— | | 75–76° |
| 41 | ⬡— | S | O | O | $CH_3$— | | 108–110° |

| No. | A | X | Y | Z | R₁ and R₂ | B.P., on molecular distillation | M.P. on molecular distillation |
|---|---|---|---|---|---|---|---|
| 42 | (phenyl) | S | O | O | $C_2H_5$— | Not distillable | |
| 43 | (phenyl) | O | S | S | $CH_3$— | | 79–80° |
| 44 | (phenyl) | O | S | S | $C_2H_5$— | | 39–40° |
| 45 | (phenyl) | O | S | O | $C_2H_5$— | Not distillable | |
| 46 | (phenyl) | S | S | S | $C_2H_5$— | | 87–88° |
| 47 | (phenyl) | S | S | O | $CH_3$— | | 100–115° |
| 48 | (phenyl) | S | S | O | $C_2H_5$— | | 66–68° |
| 49 | $CH_3$— | S | S | S | $CH_3$— | Not distillable | |
| 50 | $CH_3$— | S | S | O | $CH_3$— | ...do... | |
| 51 | $CH_3$— | S | S | O | $C_2H_5$— | ...do... | |

Of the active ingredients of the general Formula I having a 1,3,4-oxadiazol-2-one configuration, those have particularly good contact insecticidal and acaricidal activity which contain hydrogen or a methyl or methoxymethyl group in the 5-position (substituent A) and wherein $R_1$ and $R_2$ are methyl or ethyl. Oxadiazolone derivatives containing a pyridyl radical in the 5-position are particularly good acaricides whilst the insecticidal action is less marked.

Of the active ingredients having a 1,3,4-oxadiazole-2-thione configuration, O,O-diethyl- and O,O-dimethyl-S - [5-ethyl-1,3,4-oxadiazole-2(3H)-thionyl-(3)-methyl]-dithiophosphate are distinguished by a particularly good acaricidal action as well as a good insecticidal action. The 1,3,4-thiadiazole-2-thione derivatives containing a methyl group in the 5-position are absolutely excellent acaricides.

The active ingredients can be used in known ways, either per se or in combination with suitable adjuvants, e.g., the usual pulverulent solid, semi-solid (salve-like), liquid or gaseous carriers, diluents, and/or distributing (dispersing) agents.

Depending on the intended application, the new active ingredients produced according to the invention can be combined with suitable carriers and/or distributing agents to form dusts, suspensions, emulsions or solutions which attain a fine distribution of the active substances on the plants and other substrata to be protected from attack by insects and/or mites.

Dusts suitable for application of the active susbtances according to the invention can be produced, for example, by mixing or milling together the active substances with a solid carrier. As such can be used: talcum, diatomaceous earth, kaolin, bentonite, calcium carbonate, boric acid or tricalcium phosphate. On the other hand, the substances can also be brought onto the carriers by means of a volatile solvent.

To produce emulsions, the active substances as such or after dissolving them in organic solvents such as e.g. xylene, can be emulsified in water which contains a capillary active substance. For practical application however, it is generally more advantageous, first to combine liquid active substances with capillary active substances or to combine solid or liquid active substances with inert organic solvents and capillary active substances to produce concentrates which, in their turn, are single phase systems, i.e. solutions, or multi-phase systems; these can then be worked up with water into ready-for-use emulsions. As capillary active substances, cation active substances such as e.g. quaternary ammonium salts; anion active substances such as e.g. soap, soft soap, salt of aliphatic long-chain sulphuric acid monoesters, long-chain alkoxy-acetic acids and aliphatic-aromatic sulphonic acids; and non-ionogenic substances such as e.g. polyethylene glycol ethers of fatty alcohols or of dialkyl phenols and polycondensation products of ethylene oxide can be used. Cyclic hydrocarbons such as benzene, toluene or, particularly, xylene, and also ketones such as acetone, butanone, cyclohexanone or methylcyclohexanones are suitable, for example, as solvents for the production of emulsion concentrates.

Suspensions can be obtained by suspending wettable powders in water, which powders are produced in their turn by combining solid active substances with capillary active substances or combining solid or liquid active substances with solid pulverulent carriers and capillary active substances.

In addition, the active substances produced according to the invention can also be dissolved in organic solvents, for example in chlorinated hydrocarbons such as trichloroethylene or in medium petroleum fractions, possibly with the addition of auxiliary solvents such as acetone or higher ketones. Finally, the active substances can be dispersed in the air also, in the form of aerosol, smoke or mist, this particularly in storerooms or greenhouses.

To increase the duration of action, it is sometimes advantageous to add suitable epoxides as stabilisers either before or after the active substances are combined with the carriers. Such substances such as e.g. epichlorohydrin, cyclohexenoxide, styrene oxide, glycide ethers such as 1-phenoxy-2,3-epoxypropane or 1-β-naphthoxy-2,3-epoxypropane, increase to a surprising extent the stability of the active substances usable according to the invention in spite of the fact that in this case they cannot serve to bind the hydrogen chloride as no aliphatically bound chlorine atoms which would cause liberation of the hydrogen chloride are present. Thus the stabilisation of the usable active substances by means of epoxide compounds forms a further subject of the present invention.

If desired, the biological action of the agents usable according to the invention can be broadened by the addition of other insecticidal substances such as e.g. hexachlorocyclohexane, dichlorodiphenyltrichloroethane, toxaphene, calcium arseniate, (p-nitrophenyl)-diethyl thiophosphate, (3-chloro-4-nitrophenyl)-dimethyl thiophosphate, [2-isopropyl-4-methylpyrimidyl-(6)]-diethyl thiophosphate, (β,β-dichlorovinyl)-dimethyl phosphate, (α-hydroxy, β,β,β-trichloroethyl)-phosphonic acid dimethyl ester or S-(1,2-dicarboethoxyethyl)-O,O-dimethyl dithiophosphate, or of acaricidal or fungicidal substances such as e.g. S-(4-chlorophenylmercaptomethyl)-O,O-diethyl dithiophosphate, S-(2,5-dichlorophenylmercaptomethyl)-O,O-diethyl-dithiophosphate or N-trichloromethane sulphenyl tetrahydrophthalimide, methane sulphone-N-trichloromethane sulphenyl-p-chloranilide or sulphur, or of nematocidal or herbicidal substances.

The following examples show some suitable forms of application. Parts therein are given as parts by weight.

*Example 24*

1 part of O,O-dimethyl-S-[5-phenyl-1,3,4-oxadiazol-2(3H)-onyl-(3)-methyl]-dithiophosphate and 99 parts of a carrier, e.g. talcum, bentonite or calcium carbonate, are mixed in a ball mill and the mixture is ground finely to a dust in a mill.

*Example 25*

25 parts of O,O-diethyl-S-[1,3,4-oxadiazol-2(3H)-onyl-(3)-methyl]-thiophosphate are dissolved in 60 parts of xylene and 15 parts of an ethylene oxide condensation product with alkyl phenols are added. Also, a corresponding part of the xylene can be replaced by 2.5 parts of epichlorohydrin.

Ready-for-use emulsions are obtained by mixing the solutions so produced with, for example, 500 to 2000 times the amount of water.

*Example 26*

20 parts of O,O-di-isopropyl-S-[5-ethyl-1,3,4-oxadiazol-2(3H)-onyl-(3)-methyl]-dithiophosphate are finely ground with 20 parts of kieselguhr, 5 parts of magnesium carbonate or calcium carbonate, 47.5 parts of kaolin, 5 parts of an alkanol sulphonic acid-ethylene oxide condensation product, to give a wettable powder which, on suspending in water, produces ready-for-use sprays.

*Example 27*

1–2 parts of O,O-diethyl-S-[5-methyl-1,3,4-oxadiazol-2(3H)-onyl-(3)-methyl]-dithiophosphate are dissolved in 10 parts by volume of isopropanol and this solution is mixed with 89–88 parts by volume of petroleum boiling between 180 and 220°, whereupon a highly insecticidal solution which can be sprayed well is obtained.

The following examples are merely illustrations of applications of some compounds, according to this invention, to pests and show the remarkable results obtained therewith.

*Example 28*

10 mg. O,O-diethyl-S-[5-methyl-1,3,4-oxadiazol-2(3H)-onyl-(3)-methyl]-dithiophosphate dissolved in acetone were put into a petri dish and, after evaporation of the solvent, 20 domestic flies were put into the dish; after 25 minutes all flies were in the dorsal position, which shows the excellent contact-insecticidal action of this compound. An analogously good action was obtained when grain weevils were used instead of domestic flies.

*Example 29*

DDT-resistant Colorado beetle larvae were placed on the haulms of potato plants which had been previously sprayed with a 0.2% emulsion of O,O-diethyl-S-[5-methyl-1,3,4-oxadiazol-2(3H)-onyl-(3)-methyl]-thiophosphate. After 40 minutes, all larvae which had eaten from the potato plants were immobilised and died afterwards.

*Example 30*

Bean leaves infested by adults, larvae and nymphs of the common red spider (*Tetranychus urticae*) were sprayed with a 1% aqueous emulsion of O,O-dimethyl-S-[5-methyl-1,3,4-thiadiazole-2(3H)-thionyl-(3)-methyl]-dithiophosphate. After 6 days, practically all spiders, larvae and nymphs had been killed.

What I claim is:

1. Method for controlling pests which comprises contacting the pests with a compound of the formula $$A-C\underset{N-N-CH_2-S-P(OR_1)(OR_2)(=Z)}{\overset{Y-C=X}{\diagup\diagdown}}$$

wherein
X, Y and Z are independently selected from the group consisting of sulphur and oxygen,
$R_1$ and $R_2$ independently are lower alkyl groups having 1 to 3 carbon atoms,
A is a member selected from the group consisting of hydrogen, lower alkyl, lower alkoxy-lower alkyl, lower alkylmercapto-lower alkyl, phenyl, benzyl, chlorophenyl, pyridyl and furyl.

2. Method for controlling pests which comprises contacting the pests with a pesticidal composition comprising as an active ingredient a compound of the formula $$A-C\underset{N-N-CH_2-S-P(OR_1)(OR_2)(=Z)}{\overset{Y-C=X}{\diagup\diagdown}}$$

wherein
X, Y and Z are independently selected from the group consisting of sulphur and oxygen,
$R_1$ and $R_2$ independently are lower alkyl groups having 1 to 3 carbon atoms,
A is a member selected from the group consisting of hydrogen, lower alkyl, lower alkoxy-lower alkyl, lower alkylmercapto-lower alkyl, phenyl, benzyl, chlorophenyl, pyridyl and furyl.

3. A pesticidal composition comprising as an active ingredient a pesticidally effective amount of a compound of the formula $$A-C\underset{N-N-CH_2-S-P(OR_1)(OR_2)(=Z)}{\overset{Y-C=X}{\diagup\diagdown}}$$

wherein
X, Y and Z are independently selected from the group consisting of sulphur and oxygen,
$R_1$ and $R_2$ independently are lower alkyl groups having 1 to 3 carbon atoms,
A is a member selected from the group consisting of hydrogen, lower alkyl, lower alkoxy-lower alkyl, lower alkylmercapto-lower alkyl, phenyl, benzyl, chlorophenyl, pyridyl and furyl,
and a pesticide adjuvant as carrier therefor.

4. Method according to claim 2, wherein the active ingredient is O,O-dimethyl-S-[1,3,4-oxadiazol-2(3H)-onyl-(3)-methyl]-dithiophosphate.

5. Method according to claim 2, wherein the active ingredient is O,O-diethyl-S-[1,3,4-oxadiazol-2(3H)-onyl-(3)-methyl]-thiophosphate.

6. Method according to claim 2, wherein the active ingredient is O,O-dimethyl-S-[5-methyl-1,3,4-oxadiazol-2(3H)-onyl-(3)-methyl]-dithiophosphate.

7. Method according to claim 2, wherein the active ingredient is O,O-diethyl-S-[5-methyl-1,3,4-oxadiazol-2(3H)-onyl-(3)-methyl]-dithiophosphate.

8. Method according to claim 2, wherein the active ingredient is O,O-diethyl-S-[5-methyl-1,3,4-oxadiazol-2(3H)-onyl-(3)-methyl]-thiophosphate.

9. A pesticidal composition according to claim 3, wherein the active ingredient is O,O-dimethyl-S-[1,3,4-oxadiazol-2(3H)-onyl-(3)-methyl]-dithiophosphate.

10. A pesticidal composition according to claim 3, wherein the active ingredient is O,O-diethyl-S-[1,3,4-oxadiazol-2(3H)-onyl-(3)-methyl]thiophosphate.

11. A pesticidal composition according to claim 3, wherein the active ingredient is O,O-dimethyl-S-[5-methyl-1,3,4-oxadiazol-2(3H)-onyl-(3)-methyl]-dithiophosphate.

12. A pesticidal composition according to claim 3, wherein the active ingredient is O,O-diethyl-S-[5-methyl-1,3,4-oxadiazol-2(3H)-onyl-(3)-methyl]-dithiophosphate.

13. A pesticidal composition according to claim 3, wherein the active ingredient is O,O-diethyl-S-[5-methyl-1,3,4-oxadiazol-2(3H)-onyl-(3)-methyl]-thiophosphate.

14. The method of combatting insects which comprises contacting the insects with a compound of the formula

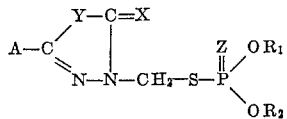

wherein X, Y and Z is a member selected from the group consisting of sulphur and oxygen, $R_1$ and $R_2$ are each lower alkyl having 1 to 3 carbon atoms, and A is a member selected from the group consisting of hydrogen, lower alkyl, monocarbocyclic aryl, pyridyl and furyl.

References Cited by the Examiner

UNITED STATES PATENTS

| | | | |
|---|---|---|---|
| 2,706,194 | 4/1955 | Morris et al. | 260—307 |
| 2,726,246 | 12/1955 | Trosken | 260—302 |
| 2,736,729 | 2/1956 | Krzikalla et al. | 260—302 |
| 2,974,085 | 3/1961 | Bartels et al. | 167—33 |

FOREIGN PATENTS 713,278  8/1954  Great Britain.

JULIAN S. LEVITT, *Primary Examiner.*

IRVING MARCUS, MORRIS O. WOLK, *Examiners.*

DUVAL T. McCUTCHEN, DONALD B. MOYER,
*Assistant Examiners.*